US005506464A

United States Patent [19]

Ooms

[11] Patent Number: 5,506,464

[45] Date of Patent: Apr. 9, 1996

[54] UNIT OF ELECTRIC LAMP AND REFLECTOR

[75] Inventor: Leo F. M. Ooms, Turnhout, Belgium

[73] Assignee: U.S. Philips Corporation, New York, N.Y.

[21] Appl. No.: 143,671

[22] Filed: Oct. 27, 1993

[30] Foreign Application Priority Data

Oct. 30, 1992 [EP] European Pat. Off. .............. 92203344
Jul. 6, 1993 [EP] European Pat. Off. .............. 93201971

[51] Int. Cl.[6] ................................ H01J 5/16; H01J 5/48; C03B 23/20; C03B 27/00

[52] U.S. Cl. .............. 313/113; 313/318.08; 313/318.11; 65/42; 362/306; 362/310; 362/350

[58] Field of Search .................................. 313/113, 159, 313/115, 234, 244, 252, 315, 316, 317, 318.01, 318.02, 318.08, 318.11; 445/44; 65/59.2, 42; 362/296, 306, 310, 341, 347, 350, 263

[56] References Cited

FOREIGN PATENT DOCUMENTS 2284187 4/1976 France .................................. 313/113
8204004 5/1984 Germany ............................... 313/113

*Primary Examiner*—Scott A. Rogers
*Assistant Examiner*—Jerome Grant, II
*Attorney, Agent, or Firm*—Brian J. Wieghaus

[57] ABSTRACT

The electric-lamp/reflector unit has a moulded reflector body (1) comprising a hollow neck-shaped portion (5). An electric lamp having a lamp vessel (11) provided with a first (14) and a second opposed end portion (15) is fixed at its first end portion within the neck-shaped portion. The neck-shaped portion (5) has a narrowed portion (6) adjacent the reflecting surface (3) of the reflector body, from which portion the neck-shaped portion widens conically towards a cap (20) borne by the neck-shaped portion.

20 Claims, 2 Drawing Sheets

UNIT OF ELECTRIC LAMP AND REFLECTOR

BACKGROUND OF THE INVENTION

The invention relates to a unit of an electric lamp and a reflector, comprising:

a moulded reflector body provided with a reflector portion having a concave reflecting surface with an optical axis, and integral therewith a hollow neck-shaped portion surrounding said optical axis;

an electric lamp provided with a light-transmitting lamp vessel which is sealed in a vacuumtight manner and which has a cavity in which an electric element is arranged and which lamp vessel is provided with a first and a second mutually opposing end portion with seal, through which seals respective current conductors connected to the electric element issue from the lamp vessel to the exterior, the electric lamp being fixed in the reflector body with the first end portion inside the neck-shaped portion, while the cavity lies within the reflecting portion and the electric element is on the optical axis;

a lamp cap having an electric contact to which a current conductor is connected, which lamp cap is fixed to the neck-shaped portion of the reflector body.

Such a unit of electric lamp and reflector is known from U.S. Pat. No. 4,423,348.

Units of this type may be used for projection purposes, for example, film or slide projection, but also in projection TV devices. If the light generated by the lamp is to be efficiently used, it is necessary for the lamp to be positioned with its electric element on the optical axis of the reflector portion. Variations in the position of this element in the lamp vessel render a wide neck-shaped portion necessary so as to allow lateral displacements of the lamp. A wide neck-shaped portion, however, reduces the size of the reflecting surface of a reflector body of a given shape and dimension.

A further loss of reflecting surface area occurs in that the reflector body must have such a shape as to be clearing. "Clearing" means that the reflector body must be capable of being removed from the mould in which it was formed. This is only possible when a displacement of this body in the open mould is possible, which leads to a clearance between the mould and the body on all sides. Known reflector bodies for this purpose widen towards the reflecting portion. If there should be sufficient space for a lateral displacement of the lamp at the free end in the neck-shaped portion, this neck-shaped portion should accordingly be extra spaceous adjacent the reflecting portion.

According to the Application EP 92 201 469 not previously published, the neck-shaped portion is subdivided into two longitudinal parts, which parts are joined together during the assembly of the lamp with the reflector. Since the neck-shaped portion integral with the reflecting portion is short here, the widening towards the reflecting portion is correspondingly small. A disadvantage, however, is that the number of components to be assembled has increased owing to this subdivision.

SUMMARY OF THE INVENTION

It is an object of the invention to provide a unit of an electric lamp and a reflector of the kind described in the opening paragraph which is of a simple construction and which has a comparatively large reflecting surface.

According to the invention, this object is realised in that the neck-shaped portion internally has a narrowed portion which merges into the reflecting surface and the neck-shaped portion widens internally from the narrowed portion conically towards the lamp cap.

Owing to the shape of the reflector body, in particular of the neck-shaped portion, the reflecting surface may be formed by a first mould part and the cavity in the neck-shaped portion by a second mould part cooperating with the first. In the closed mould, these two parts meet one another at the narrowed portion. The narrowed portion as a result may be chosen only as wide as is necessary for positioning the electric element on the optical axis by means of a lateral displacement. The opening in the reflecting surface where the neck-shaped portion merges into the reflecting portion as a result generally lies well within the solid angle around the first end portion of the lamp within which no light, or no useful light owing to refraction by the material of the lamp vessel, is emitted.

The neck-shaped portion renders it possible to fix the lamp vessel to the reflector body circumferentially therein, for example with a solidified mass, for example with a cement compound such as, for example, lamp cement. It is convenient to that end that the neck-shaped portion is widest at its free end. It is aim favourable that the neck-shaped portion has a narrowed portion near the reflector portion. This counteracts the risk of a not yet solidified adhesive compound running into the reflecting portion. It is favourable that the electric lamp can be assembled with the reflector body without any other components of the unit having to be present then already.

In an embodiment, a ring is present around the first end portion near the narrowed portion in the neck-shaped portion. An advantage of this is that an adhesive compound, for example a cement, such as, for example, lamp cement, may be used which flows comparatively easily during its application. The ring, however, narrows the passage to the reflecting portion so that the passage is blocked also for a readily flowing mass.

It is favourable for the safety of the unit when the reflector body is closed off by a transparent plate. It can be prevented thereby that flammable objects come into contact with hot portions of the lamp. The risk involved in an explosion of the lamp vessel can also be reduced by this. The transparent plate may be fixed to the reflector body with an adhesive compound, for example, with silicone glue. Alternatively, the transparent plate may be fastened by mechanical means, for example, with a ring flanged around the reflector body. Instead, a clamping ring or a number of clamps may also be used.

In a favourable modification, the reflecting portion has a substantially cylindrical end potion near the transparent plate. If so desired, the volume inside the reflecting portion can be greater as a result, to obtain a lower overall temperature without the volume increase leading to a diameter increase of the unit. Such a diameter increase would occur when a concave reflecting surface which is curved, for example, parabolically or elliptically, were enlarged in axial direction, not cylindrically, but according to that same curvature.

Alternatively or in addition, it is possible to give the reflector body at its outside a profiled, for example, fibbed surface. The surface area is increased by this and a greater heat transfer is rendered possible. Not only a transparent plate, but also an adhesive compound for fastening the lamp in the neck-shaped portion in fact limits or prevents ventilation of the space in the reflector body.

The lamp cap may be provided with openings, for example slots, for creating an air flow through this cap. Alternatively, the lamp cap may be a body of, for example, ceramic material or metal, for example cylindrical in shape, which is fixed around the first end portion. The lamp cap may, for example, project into the neck-shaped portion and be fastened therein, for example, with cement.

The electric element may be an incandescent body, for example in an inert gas comprising a halogen, or a pair of electrodes in an ionizable gas. If it is desirable to operate or (re)ignite a discharge are at a high voltage, it is favourable when the current conductor is passed from the second end portion through the reflector portion to the exterior and is connected there to a contact member. The two contact members may then be at a comparatively large distance from one another, so that the risk of flash-over between these members is very small.

In a unit comprising an electric discharge lamp, for example a high-pressure discharge lamp, for example a lamp having a filling comprising rare gas and metal halides, or a lamp having a filling of rare gas, mercury and halogen, and with a very high operational pressure, for example a pressure of approximately 200 bar or more, it is favourable when the reflector body has means at its exterior for accommodating a low-voltage/high-voltage converter, for example, a recess suitable for this purpose. Conductors carrying a high voltage may then be very short.

BRIEF DESCRIPTION OF THE DRAWING

Embodiments of the unit of electric lamp and reflector according to the invention are shown in the drawing, in which.

DESCRIPTION OF THE PREFERRED EMBODIMENTS

Figure 1:
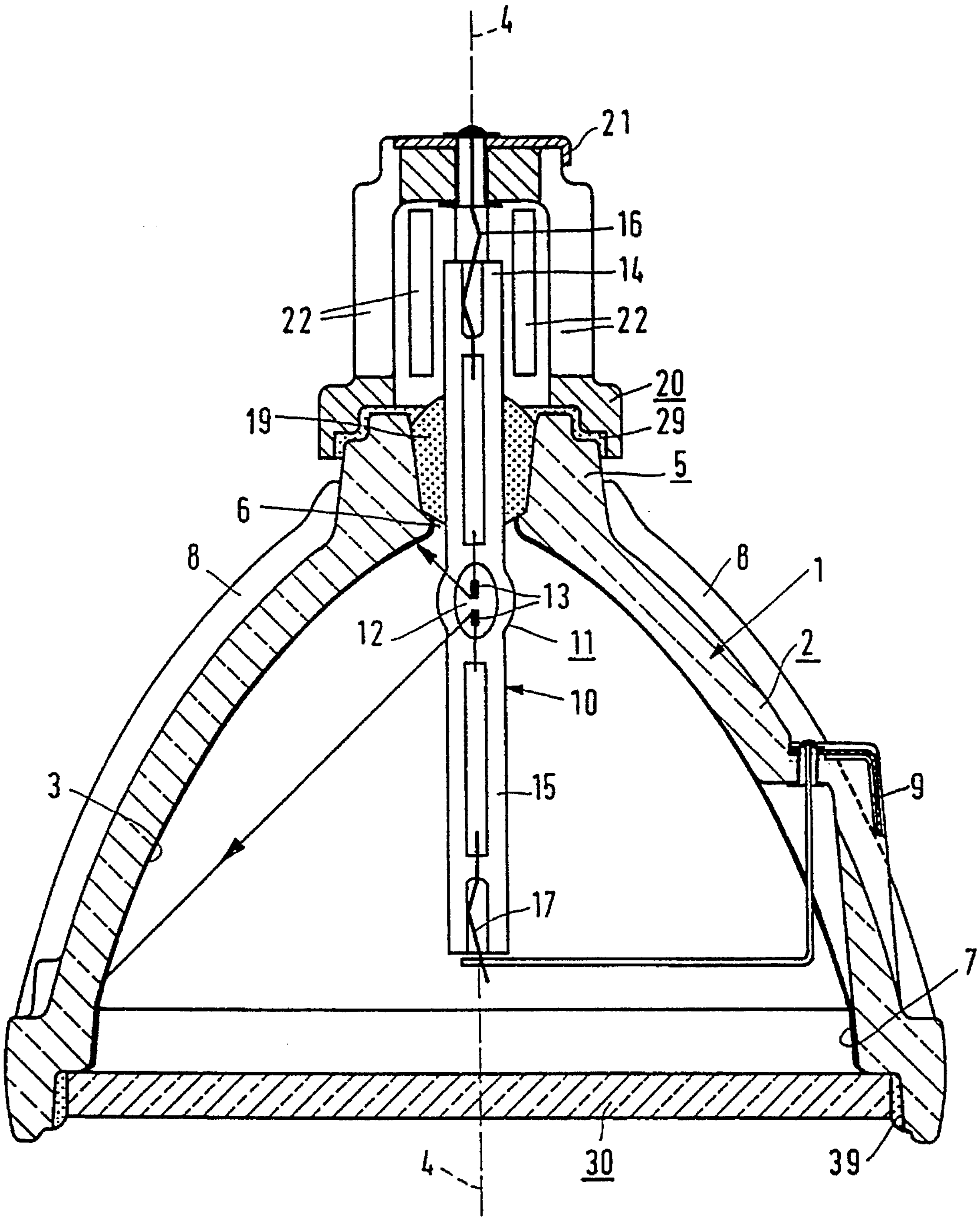
FIG. 1 shows a first embodiment in axial section.

In FIG. 1, the unit of electric lamp and reflector has a moulded reflector body 1 which is provided with a reflector portion 2 with a concave, for example, paraboloidically curved reflecting surface 3 with an optical axis 4, and integral therewith a hollow neck-shaped portion 5 surrounding the optical axis. In an alternative embodiment, however, this surface may be curved, for example, ellipsoidically. In the drawing, the reflector body is made of glass and has a metal layer, for example an aluminium layer, serving as a mirror. Alternatively, however, the body may be made of, for example, metal or synthetic resin. The unit also comprises an electric lamp 10 which is provided with a light-transmitting lamp vessel 11, for example made of quartz glass, which is sealed in a vacuumtight manner and has a cavity 12 in which an electric element 13, a pair of electrodes in the Figure, is arranged. The lamp vessel has a first 14 and a second 15 end portion with seal, which end portions are mutually opposed, while a respective current conductor 16, 17 runs through each seal and is connected to the electric element 13 and issues from the lamp vessel 11 to the exterior. The lamp shown is a high-pressure mercury discharge lamp which has a pressure of approximately 200 bar or more during operation. The lamp vessel contains besides mercury a rare gas, for example argon, and bromine. The electric lamp 10, which consumes a power of approximately 70 to approximately 150 W, is fixed in the reflector body 1, by means of cement 19 in the Figure, with the first end portion 14 inside the neck-shaped portion 5, the cavity 12 inside the reflecting portion 2, and the electric element 13 on the optical axis 4. A lamp cap 20, made of ceramic material in the Figure such as, for example, steatite, with an electric contact 21 to which a current conductor 16 is connected, is fixed to the neck-shaped portion 5 of the reflector body 1, by means of cement 29 in the Figure.

The neck-shaped portion 5 internally has a narrowed portion 6 which merges into the reflecting surface 3. The neck-shaped portion widens internally from the narrowed portion conically towards the lamp cap 20.

The lamp shown emits light at an angle of ±45° to the perpendicular on the discharge path. Thanks to the narrowed portion, substantially all the generated light is directed towards the reflecting surface 3 where the latter is paraboloidically curved and is not deformed by the rounded portion merging into the neck-shaped portion. A first and a second part of a mould have come together at the area of the narrowed portion during moulding of the reflector body.

The reflector body 1 shown is closed off by a transparent plate 30. The plate is fixed with cement 39 in the Figure, but could alternatively have been mounted by other means, for example a metal ring.

The reflecting portion 2 has a substantially cylindrical end portion 7 adjacent the transparent plate 30, whereby the volume of the reflecting portion is increased without substantially increasing also the diameter of the unit.

The reflector body 1 has a profiled surface at its exterior. Several corrugations 8 extend in axial direction.

The lamp cap 20 is provided with vent holes 22.

The current conductor 17 issuing from the second end portion 15 is passed through the reflector portion 2 to the exterior and connected to a contact member 9 there.

Figure 2B:
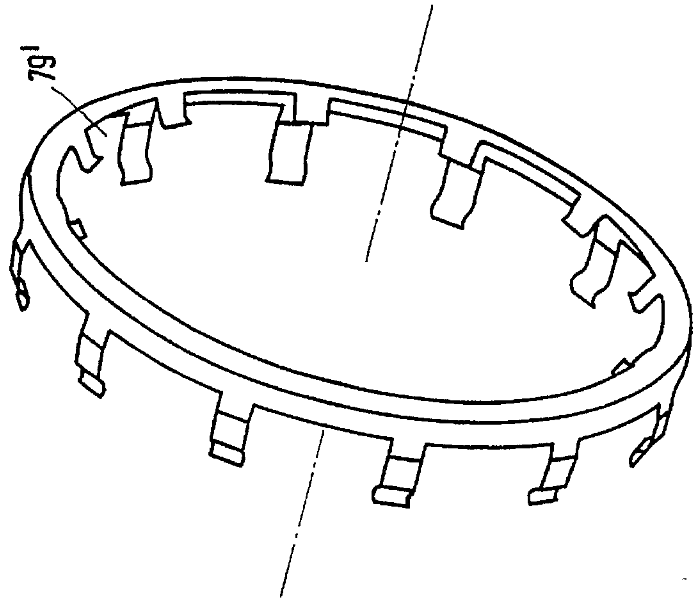
FIG. 2*b* shows a clamping ring for a modified version of the unit of FIG. 2*a*.
Figure 2A:
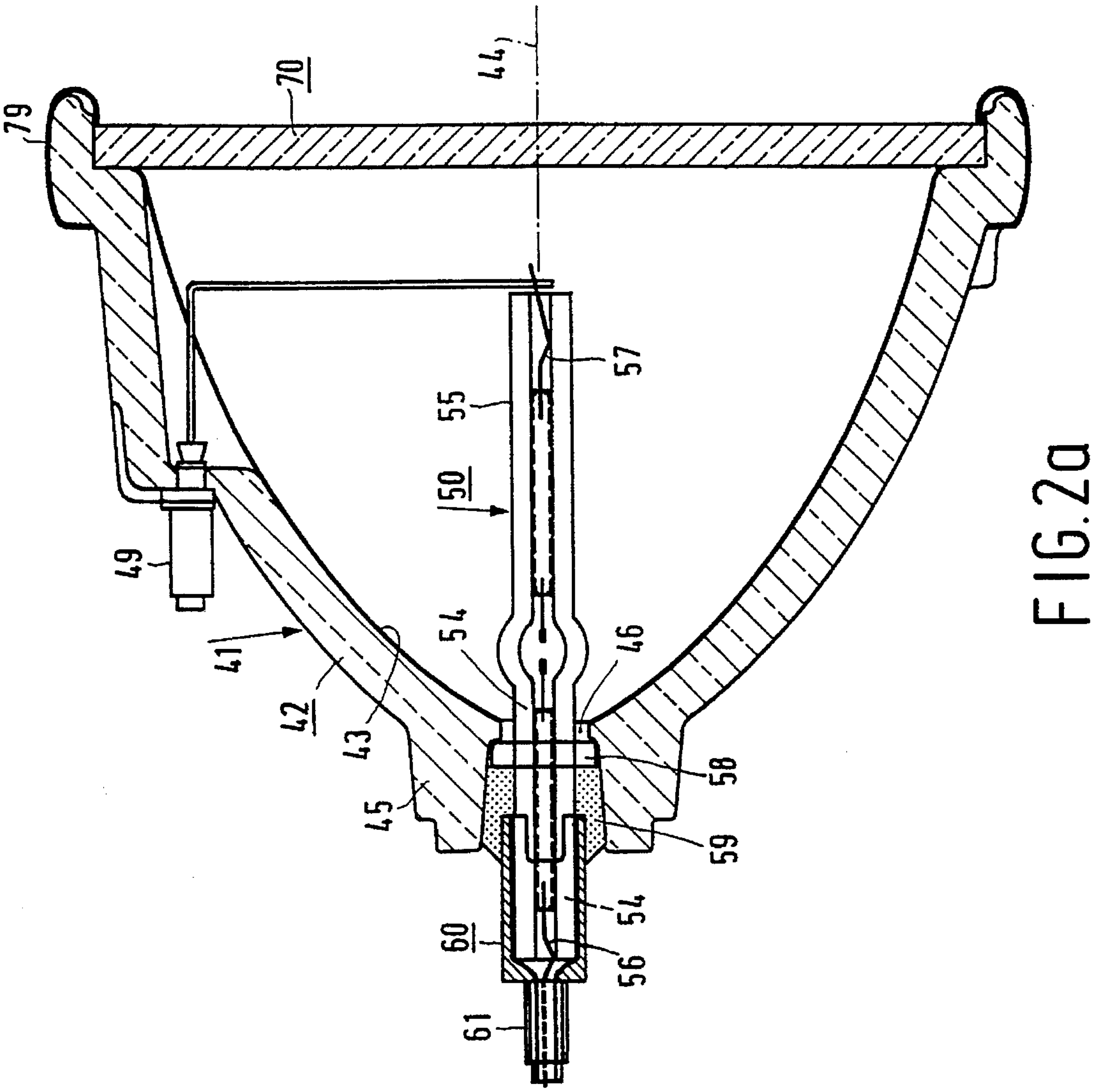
FIG. 2*a* shows a second embodiment in axial section.

In FIG. 2*a*, pans corresponding to those of FIG. 1 have reference numerals which are 40 higher. A ring 58 is present near the narrowed portion 46 and around the first end portion 54 of the electric lamp 50 inside the neck-shaped portion 45 of the reflector body 41. The ring, which is made, for example, of quartz glass, rests against the neck-shaped portion 45 and surrounds the first end portion with a small clearance all around, for example, of 0.1 mm. In the Figure, the lamp cap 60 is made of metal and is integral with its contact 61. The contact 61 has a screwthread for fastening a cable tag thereto by means of a nut. The lamp cap 60 is fixed with cement 59, as is the electric lamp 50. The transparent plate 70 is fastened to the reflector body 41 with a flanged ring 79.

FIG. 2*b* shows a clamping ring 79' which can be snapped around the reflector body 41 for fastening the transparent plate 70.

I claim:

1. A unit of an electric lamp and a reflector, comprising:

a molded reflector body comprising a reflector portion having a concave reflecting surface with an optical axis, and a hollow neck-shaped portion surrounding said optical axis and integral with said reflector body, an electric lamp comprising a light-transmitting lamp vessel sealed in a vacuumtight manner, enclosing a cavity and having a first and a second mutually opposing sealed end portion, an electric element arranged in the cavity, and respective current conductors connected to the electric element, extending through said sealed end portions, and issuing from the lamp vessel to the exterior, the electric lamp being fixed in the reflector body with the first end portion inside the neck-shaped portion, while the cavity lies within the reflecting portion and the electric element is on the optical axis; and a lamp cap having an electric contact to which a said current conductor is connected, which lamp cap is fixed to the neck-shaped portion of the reflector body, the neck-shaped portion internally having a narrowed portion which merges into the reflecting surface and widening internally from the narrowed portion conically towards the lamp cap.

2. A unit of an electric lamp and a reflector as claimed in claim 1, characterized in that the lamp cap includes vent holes.

3. A unit of an electric lamp and a reflector as claimed in claim 1, characterized in that the current conductor issuing from the second end portion is passed through the reflector portion to the exterior, and the reflector includes a contact member at the exterior of the reflector portion connected to said current conductor issuing from the second end portion.

4. A unit of an electric lamp and a reflector as claimed in claim 1, characterized in that a ring is present around the first end portion near the narrowed portion in the neck-shaped portion.

5. A unit of an electric lamp and a reflector as claimed in claim 1, characterized in that a ring is present around the first end portion near the narrowed portion in the neck-shaped portion.

6. A unit of an electric lamp and a reflector as claimed in claim 1, wherein a transparent plate closes off the reflector body.

7. A unit of an electric lamp and a reflector as claimed in claim 6, characterized in that the lamp cap (20) includes vent holes (22).

8. A unit of an electric lamp and a reflector as claimed in claim 6, characterized in that the current conductor issuing from the second portion extends through the reflector portion to the exterior, and the reflector includes a contact member at the exterior of the reflector portion connected to said current conductor which issues from said second end portion.

9. A unit of an electric lamp and a reflector as claimed in claim 6, characterized in that the reflector body has a profiled surface at its exterior.

10. A unit of an electric lamp and a reflector as claimed in claim 6, characterized in that a ring is present around the first end portion near the narrowed portion in the neck-shaped portion.

11. A unit of an electric lamp and a reflector as claimed in claim 6, characterized in that a ring is present around the first end portion of the lamp near the narrowed portion in the neck-shaped portion of the reflector body.

12. A unit of an electric lamp and a reflector as claimed in claim 6, characterized in that the reflecting portion (2) has a substantially cylindrical end portion adjacent the transparent plate.

13. A unit of an electric lamp and a reflector as claimed in claim 12, characterized in that the reflector body has a profiled surface at its exterior.

14. A unit of an electric lamp and a reflector as claimed in claim 12, characterized in that a ring is present around the first end portion near the narrowed portion in the neck-shaped portion.

15. A unit of an electric lamp and a reflector as claimed in claim 12, characterized in that a ring is present around the first end portion of the lamp near the narrowed portion in the neck-shaped portion.

16. A reflector lamp, comprising:

a molded reflector body comprising a reflector portion having a concave reflector surface defining an optical axis and an integral neck portion extending from said reflector portion to a base end of said reflector body, said neck portion having a cavity extending from said base end and terminating at an opening in said reflector surface, said cavity having its smallest cross-sectional dimension transverse to said optical axis at said opening and widening in the direction from said reflector surface towards said base end; and a light source arranged within said reflector portion and which is energizeable for emitting light.

17. A reflector lamp according to claim 16, wherein said light source includes at least one of (i) a current conductor extending through said cavity in said neck portion to the exterior and (ii) a sealed end portion disposed within said cavity in said neck-shaped portion.

18. A reflector lamp according to claim 16, wherein said light source emits light circumferentially towards said reflector surface and in the direction towards said base has a certain cut-off angle transverse to said optical axis within which said light is mainly emitted, which cut-off angle intercepts said reflector surface and defines a circumferential zone extending about said optical axis-in which light from said light source substantially does not impinge on said reflector surface, and said opening of said cavity at said reflector surface lying substantially entirely within said circumferential zone, whereby substantially all of the light emitted by said light source impinges on said reflector surface and not on said cavity.

19. A reflector lamp according to claim 18, wherein said light source is a discharge lamp having a discharge vessel which maintains a discharge arc during lamp operation, said discharge vessel having a sealed end portion disposed within said cavity in said neck portion and being positioned so that the discharge arc is aligned with said optical axis, said discharge arc emitting ,light mainly with said certain cut-off angle.

20. A molded reflector body for a reflector lamp, comprising:

a molded body comprising a reflector portion having a concave reflector surface defining an optical axis and an integral neck portion extending from said reflector portion to a base end of said reflector body, said neck portion having a cavity extending from said base end and terminating at an opening in said reflector surface, said cavity having its smallest cross-sectional dimension transverse to said optical axis at said opening and widening in the direction from said reflector surface towards said base end.

* * * * *